United States Patent
Even et al.

(10) Patent No.: US 6,930,424 B2
(45) Date of Patent: Aug. 16, 2005

(54) SEVERAL PHASE FOR A STATOR OF AN ALTERNATOR FOR A MOTOR VEHICLE

(75) Inventors: Denis Even, Paris (FR); Pierre Faverolle, Paris (FR); Jean-Claude Mipo, Créteil (FR); Jean-Luc Tarrago, Bonneuil/S/Marne (FR)

(73) Assignee: Valeo Equipements Electriques Moteur, Creteil (FR)

( * ) Notice: Subject to any disclaimer, the term of this patent is extended or adjusted under 35 U.S.C. 154(b) by 222 days.

(21) Appl. No.: 10/204,566

(22) PCT Filed: Dec. 21, 2001

(86) PCT No.: PCT/FR01/04147

§ 371 (c)(1),
(2), (4) Date: Aug. 21, 2002

(87) PCT Pub. No.: WO02/50976

PCT Pub. Date: Jun. 27, 2002

(65) Prior Publication Data

US 2003/0011268 A1 Jan. 16, 2003

(30) Foreign Application Priority Data

Dec. 21, 2000 (FR) .............................. 00 16738
Apr. 5, 2001 (FR) .............................. 01 04770
Oct. 19, 2001 (FR) .............................. 01 13553

(51) Int. Cl.$^7$ ............................... H02K 3/04
(52) U.S. Cl. ..................... 310/201; 310/180
(58) Field of Search ............................. 310/201, 180, 310/195, 179, 263, 184

(56) References Cited

U.S. PATENT DOCUMENTS 5,945,759 A  8/1999  Tanaka et al. ............... 310/90
6,268,678 B1 * 7/2001 Asao et al. ................. 310/201
6,326,713 B1 * 12/2001 Judson ....................... 310/112
6,740,995 B2 * 5/2004 Oohashi et al. ........... 310/68 D

FOREIGN PATENT DOCUMENTS

| DE | 40 31 276 A1 | 4/1992 |
| EP | 0 420 371 A1 | 4/1991 |
| EP | 0 881 746 A2 | 12/1998 |
| EP | 0 881 752 A1 | 12/1998 |

OTHER PUBLICATIONS

French Search Report, Aug. 30, 2001.

* cited by examiner

Primary Examiner—Darren Schuberg
Assistant Examiner—Heba Elkassabgi
(74) Attorney, Agent, or Firm—Morgan & Finnegan, LLP

(57) ABSTRACT

The invention relates to alternators for a motor vehicle, of which a stator comprises a cylindrical body, several phases each formed by a plurality of electrically conducting elements, the cylindrical body comprising radial slots for accommodating at least four phase-conductor elements forming at least four layers of conductor elements, each conductor element including two branches placed in slots each in a predetermined layer and a head forming a U-shape seen in the peripheral direction, the half of the conductor elements which are engaged by their first branches in a slot being engaged by their second respective branches in the same other slot.

According to the invention, at least first and second conductor elements of such half are such that the radii of curvature of the U-shapes of the two conductor elements are substantially identical.

20 Claims, 9 Drawing Sheets

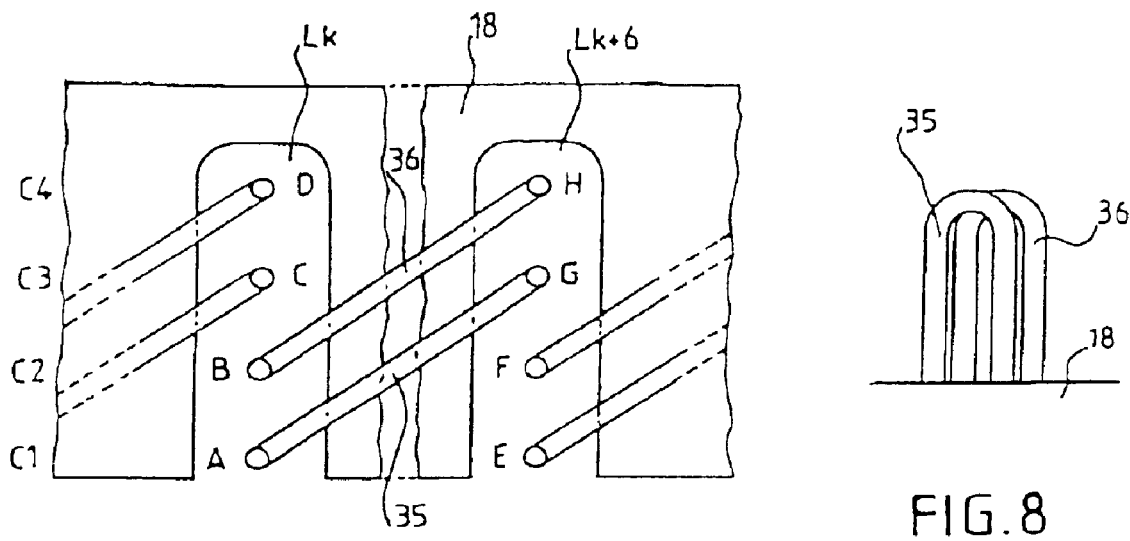
FIG.7
FIG.8
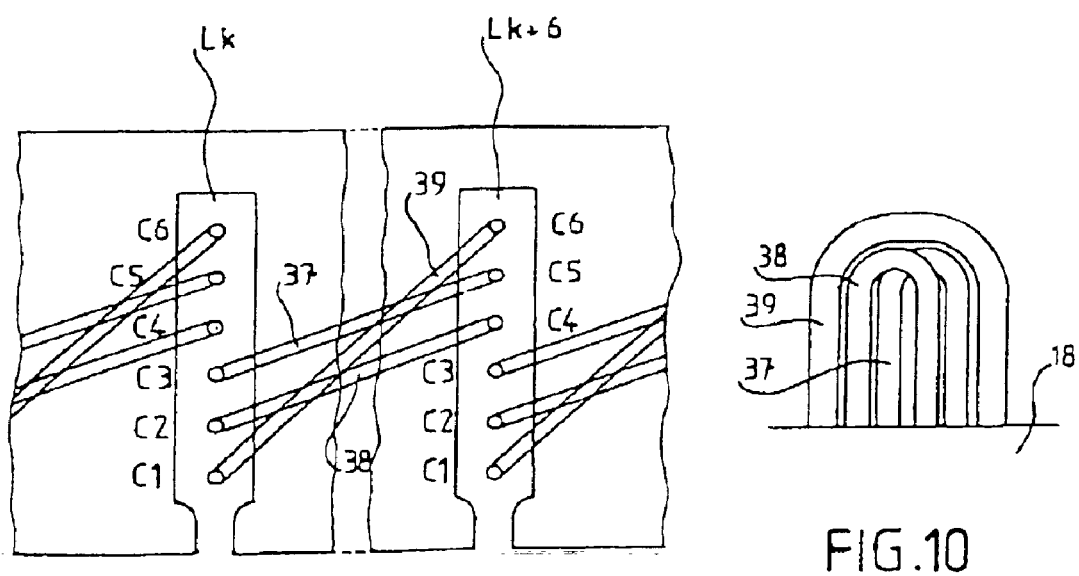
FIG.9
FIG.10

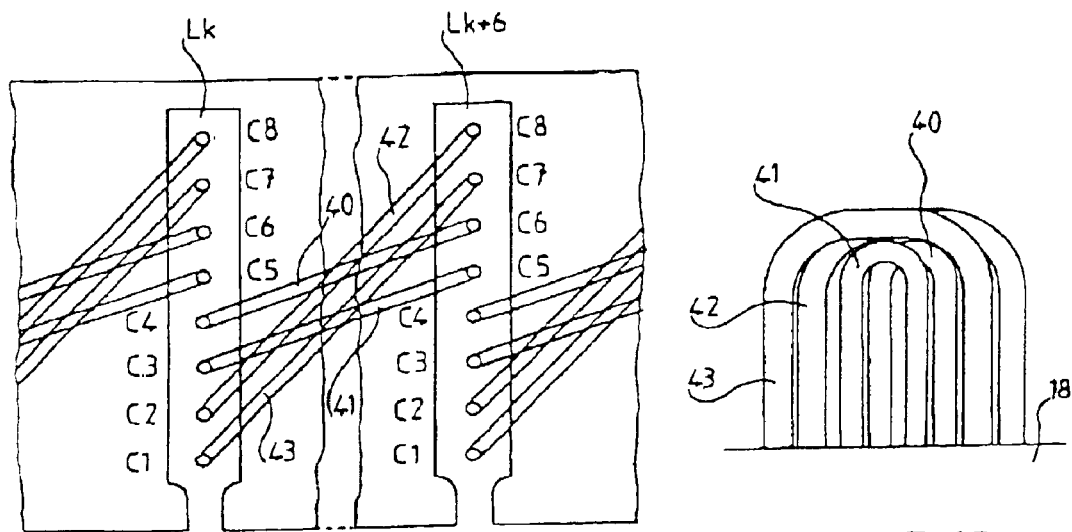
FIG.11
FIG.12
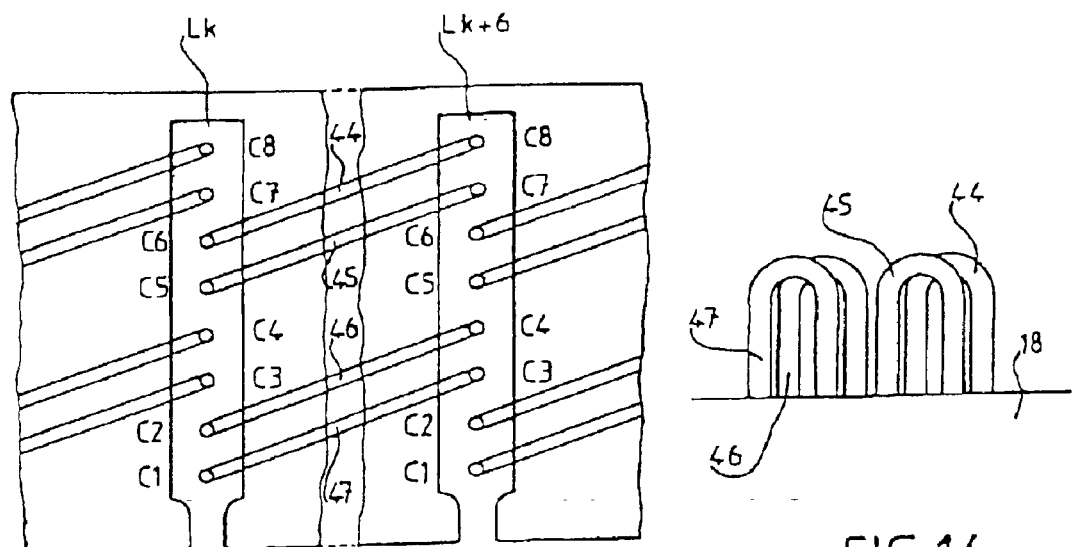
FIG.13
FIG.14

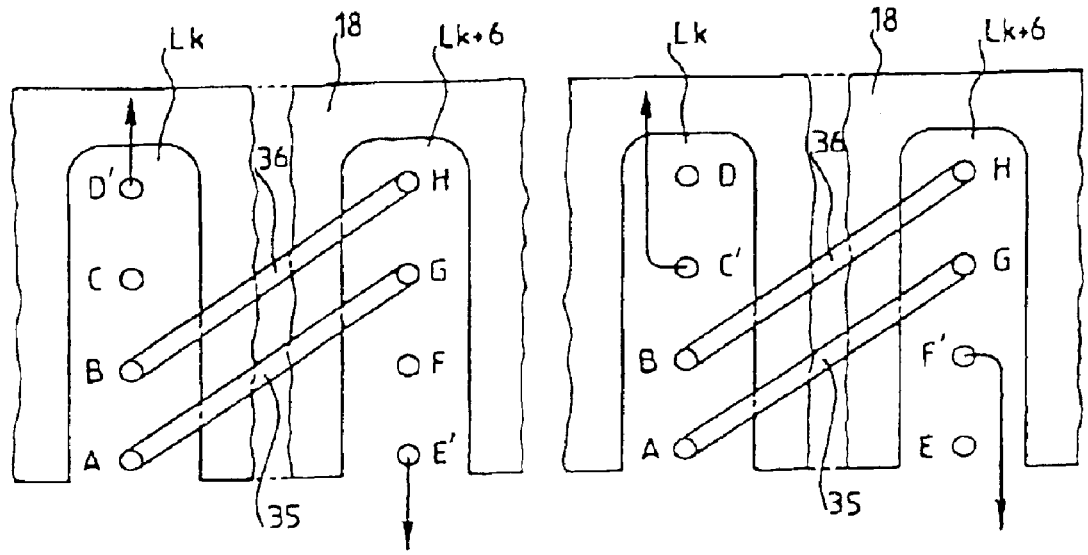
FIG.15  FIG.16
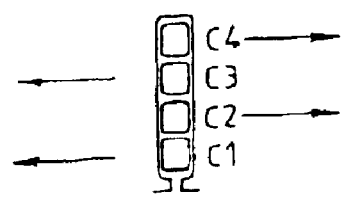
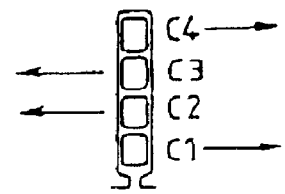
FIG.17  FIG.18
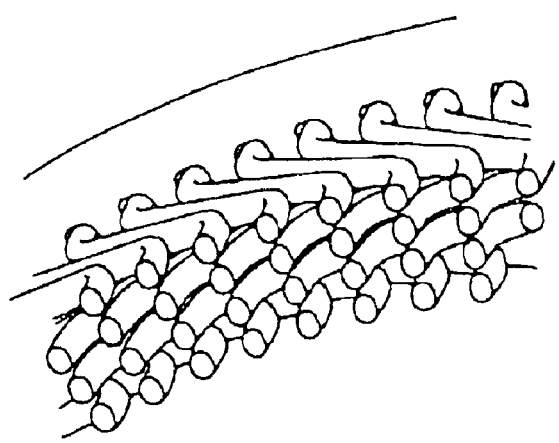
FIG.19

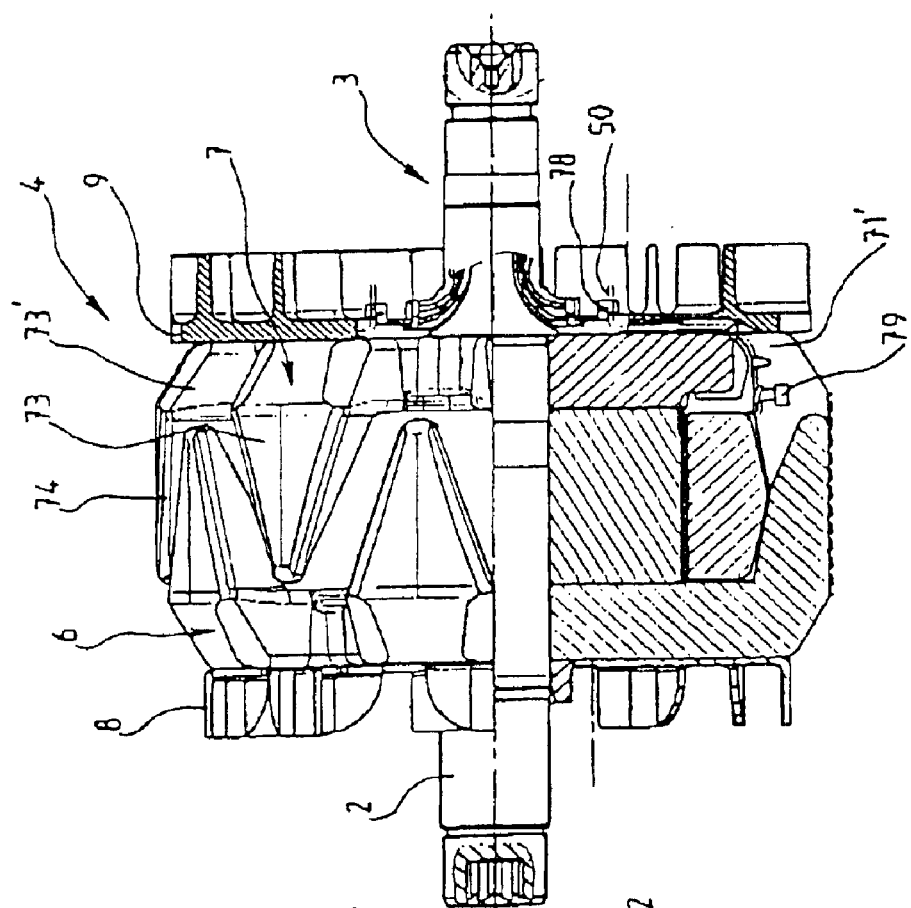
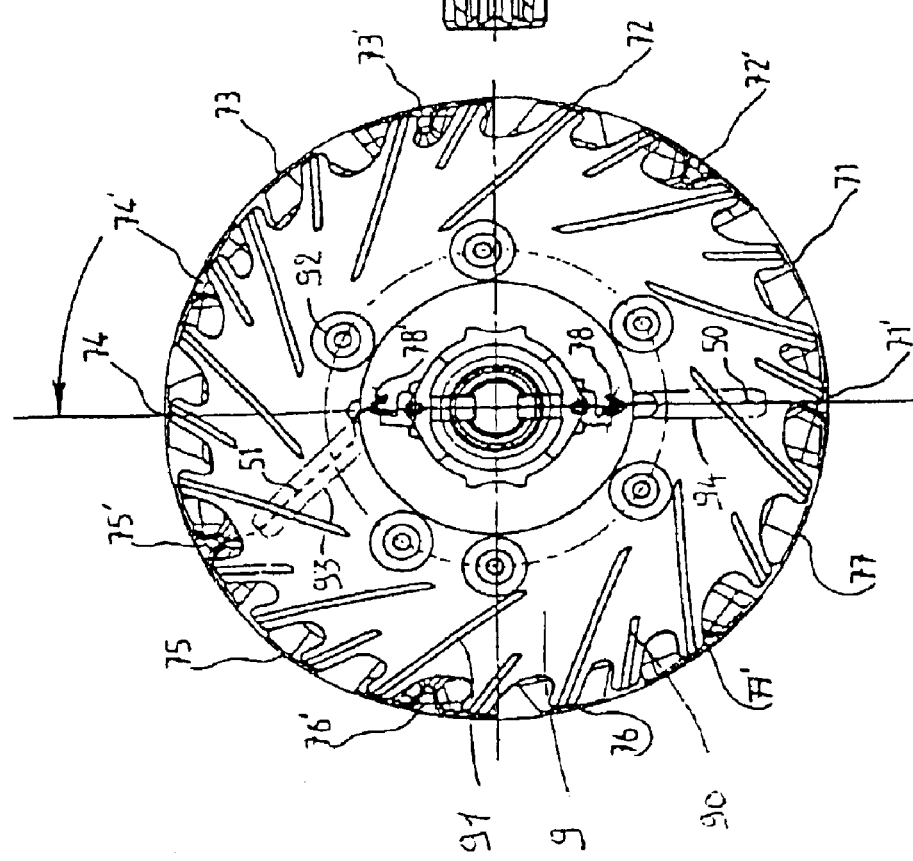

SEVERAL PHASE FOR A STATOR OF AN ALTERNATOR FOR A MOTOR VEHICLE

TECHNICAL FIELD OF THE INVENTION

The present invention relates in a general way to alternators for a motor vehicle.

STATE OF THE ART

More precisely, the invention relates to the alternators for motor vehicles comprising a stator, a claw-type rotor with N pole pairs which is arranged inside the stator and carries an excitation coil complete with an input wire and with an outlet wire, the stator comprising a cylindrical body, several phases each formed by a plurality of electrically conducting elements mounted in series along the periphery of the stator between an input and an outlet, the cylindrical body comprising, in its radially inner face, radial slots for accommodating at least four phase-conductor elements which are juxtaposed in the slot in the radial direction so as to form at least four layers of conductor elements, each conductor element exhibiting the form of a pin extending between two slots and including a first branch which is placed in a slot in a predetermined layer, and a second branch arranged in another slot in a predetermined layer and, between the two branches, on one axial side of the body of the stator, a head forming a U-shape seen in the peripheral direction, while, on the other side of the body, a free end of a branch of a conductor element is electrically connected to a free end of a branch of another conductor element, the half of the conductor elements which are engaged by their first branches in a slot being engaged by their second respective branches in the same other slot, each forming the said U-shapes between the two slots.

Alternators of this type are known from the prior art. Each slot of their stators contains four conductors, two first conductors joining this slot to the same second slot, and two other conductors joining this slot to the same third slot. The two conductors of the first pair overlap in such a way that their heads form concentric, unequal U-shapes.

The stators of these alternators require, for their manufacture, at least two pin-forming stations equipped with different tooling, one per size of U-shape. Furthermore, those pins with a small radius of curvature carry a risk of damage to the enamel for protecting the pin in the sharpest region of the U-shape. Finally, the insertion of the conductor elements into the body must be performed in at least two steps, one step for each layer of concentric pins.

OBJECT OF THE INVENTION

The object of the present invention is therefore to overcome the difficulties described above.

To that end, the invention is principally characterised in that at least first and second conductor elements of the said half are such that the radial spacing of the layers to which the two branches of the said first conductor element belong is the same as the radial spacing of the layers to which the two branches of the said second conductor element belong, and in that the radii of curvature of the U-shapes of the two conductor elements are identical.

In one embodiment of the invention with eight conductor elements per slot, including four extending between the same two slots, the said four conductor elements are grouped in pairs of adjacent conductors, the above-mentioned radial spacing being the same for the two conductor elements of the one pair, and the radii of curvature of the U-shapes of the two conductor elements of the one pair are substantially identical.

Advantageously, the above-mentioned radial spacing of the conductor elements of one of the two pairs is different from the above-mentioned radial spacing of the conductor elements of the other pair, and the radii of curvature of the U-shapes of the conductor elements of the two pairs are different.

For preference, the above-mentioned radial spacing of the conductor elements of one of the two pairs is the same as the above-mentioned radial spacing of the conductor elements of the other pair and the radii of curvature of the U-shapes of the two pairs are substantially identical.

In one embodiment of the invention with six conductor elements per slot, three of which extend between the same two slots, two of the said conductor elements are adjacent and exhibit the same above-mentioned radial spacing, the radii of curvature of the two U-shapes of the two conductor elements being substantially identical.

In one embodiment of the invention with four conductor elements per slot, two of which extend between the same two slots, the four layers of conductor elements being referenced C1, C2, C3 and C4 in increasing order of separation from the inner radial face of the body, these two conductor elements are adjacent and exhibit the same above-mentioned radial spacing, the radii of curvature of the two U-shapes of the two conductor elements being substantially identical.

Advantageously, the phase inputs are linked to branches of conductor elements in layer C1, the corresponding outlets being linked to branches of conductor elements in layer C4.

For preference, the phase inputs are linked to branches of conductor elements in layer C4, the corresponding outlets being linked to branches of conductor elements in layer C1.

For example, the phase inputs are linked to branches of conductor elements in layer C2, the corresponding outlets being linked to branches of conductor elements in layer C3.

Advantageously, the phase inputs are linked to branches of conductor elements in layer C3, the corresponding outlets being linked to branches of conductor elements in layer C2.

For preference, for each slot, at least one part of the free end of the branches situated in layers C1 and C4 is inclined along a first direction, at least a part of the free end of the branches situated in layers C2 and C3 being inclined along a second direction symmetric with the first one with respect to the radial plane in which the slot is located.

For example, for each slot, at least one part of the free end of the branches situated in layers C1 and C3 is inclined along a first direction, at least a part of the free end of the branches situated in layers C2 and C4 being inclined along a second direction symmetric with the first one with respect to the radial plane in which the slot is located.

Advantageously, at least some of the phase inputs are linked electrically so as to form a neutral point.

For preference, the rotor comprises 6, 7, 8 or 9 pole pairs.

For example, the stator comprises three phases.

Advantageously, the stator comprises two times three phases offset electrically by 30°.

For preference, the rotor comprises 7 pole pairs, the outer diameter of the cylindrical body of the stator lying between 132 mm and 138 mm.

For example, the rotor comprises 6 pole pairs, the outer diameter of the cylindrical body of the stator lying between 137 mm and 142 mm.

Advantageously, the outlets of the phases of the stator are linked to a current-rectification device with at least 12 diodes.

For preference, the rotor comprises two, front and rear, pole wheels integral with a shaft, each carrying, at their periphery, seven axial teeth oriented towards the other pole wheel, the axial teeth of the one wheel forming grooves between them, the input wire of the coil of the rotor extending radially substantially between the shaft and a first one of the said grooves of the rear pole wheel, the outlet wire extending radially substantially between the shaft and a second groove, this second groove being one of the said two grooves diametrally opposite the first groove.

For example, the outlet wire extends radially substantially between the shaft and the groove diametrally opposite the first groove and offset in angle in the normal direction of rotation of the rotor.

Advantageously, the outlet wire extends radially substantially between the shaft and the groove diametrally opposite the first groove and offset in angle in the reverse direction to the normal rotation of the rotor.

For preference, a capstan is arranged in each of the first and second grooves, the input and outlet wires making respectively at least one turn round the capstan situated in the first and second grooves.

For example, the capstans each comprise a radial spindle fixed to the rotor and a stud fixed to a free end of the radial spindle.

For preference, the two neutral points are rectified. Thus the electrical network of the motor vehicle will receive more current.

For preference, the ratio of the thickness of the yoke with respect to the width L1 of the slots should have a value lying between 0.51 and 0.57.

BRIEF DESCRIPTION OF THE DRAWINGS

Other characteristics and advantages of the invention will emerge clearly from the description of it which is given below by way of an indication and which is not in any way limiting, by reference to the annexed figures, among which:

FIG. 7 is a diagrammatic representation showing the fitting of the conductor elements of FIG. 6 in two consecutive slots of the same phase, FIG. 8 is a diagrammatic view along a peripheral direction of the heads of two conductor elements of FIG. 6, FIG. 9 is a diagrammatic representation showing the fitting of three conductor elements in two consecutive slots of the same phase in a second embodiment of the invention, FIG. 10 is a diagrammatic view along a peripheral direction of the heads of the three conductor elements of FIG. 9, FIG. 11 is a diagrammatic representation showing the fitting of four conductor elements in two consecutive slots of the same phase in a third embodiment of the invention, FIG. 12 is a diagrammatic view along a peripheral direction of the heads of the four conductor elements of FIG. 11, FIG. 13 is a diagrammatic representation showing the fitting of four conductor elements in two consecutive slots of the same phase in a fourth embodiment of the invention, FIG. 14 is a diagrammatic view along a peripheral direction of the heads of the four conductor elements of FIG. 13, FIG. 15 is a figure similar to FIG. 7, showing a fitting of the input and of the outlet of the phase of FIG. 7, FIG. 16 is a figure similar to FIG. 15, in another embodiment, FIG. 17 is a diagrammatic representation of the free ends of the branches of the conductor elements of FIG. 7, FIG. 18 is a figure similar to FIG. 17, in another embodiment variant, FIG. 19 is a view in perspective corresponding to FIG. 18, FIG. 20 is a rear view of an embodiment of the rotor of the alternator of FIG. 1, FIG. 21 is a top view with partial sectioning of the rotor of the alternator of FIG. 20.

DESCRIPTION OF PREFERRED EMBODIMENTS

Figure 1:
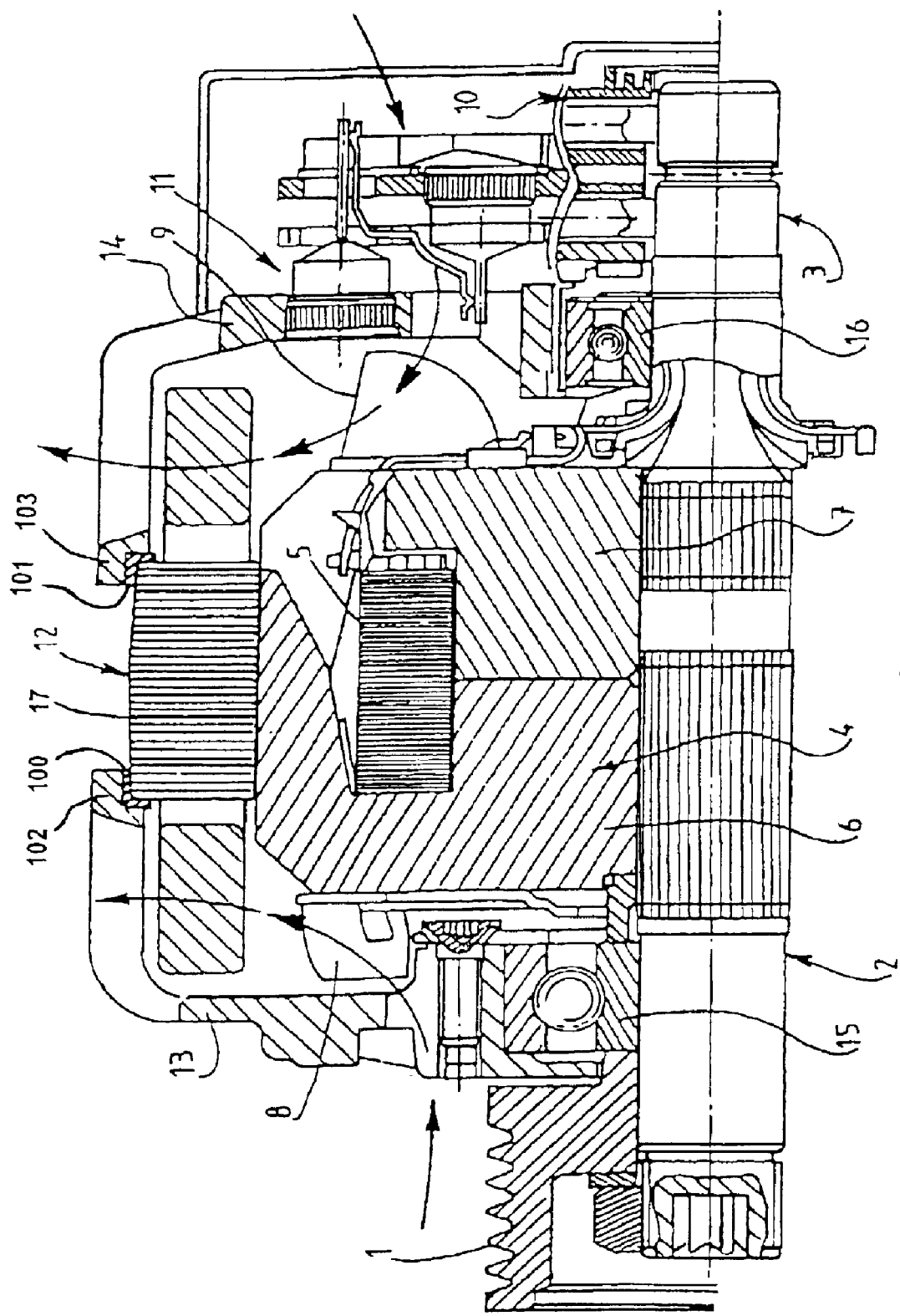
FIG. 1 is a half-view in section of an alternator according to the invention.

The general structure of an alternator for a motor vehicle will first of all be described, by reference to FIG. 1.

The alternator, going from left to right of FIG. 1, that is to say from front to rear, includes a drive pulley 1 integral with the front end of a shaft 2, the rear end of which carries collector rings (not referenced) belonging to a collector 3. The axis of the shaft 2 constitutes the axis of rotation of the machine.

Centrally, the shaft 2 carries the rotor 4, fixed on and equipped with an excitation coil 5, the ends of which are linked by links to the collector 3. The rotor 4 here is a claw-type rotor of the Lundell type, and therefore includes two, front and rear, pole wheels 6, 7 each respectively carrying a front 8 and rear 9 fan. Each wheel 6, 7 includes a flange perpendicular to the axis of the shaft 2. At the outer periphery of the flanges teeth are formed, from the same material, extending axially. The teeth have a trapezoidal shape and are given chamfers. The teeth of one of the wheels are turned towards the other wheel, being offset in angle with respect to the teeth of this other wheel. When the winding 5 is activated, the rotor 4 is magnetised and it thus defines pairs of magnetic poles, each pole wheel then including N North poles and N South poles respectively, consisting of the teeth. For further details, refer to the document EP-A-0 515 259, the teeth of the pole wheels each laterally featuring at least one anti-noise chamfer.

The fans 8, 9 include, for example, two series of blades or vanes 90 and 91, as can be seen in FIG. 20, which form ventilation channels between them. The blades are formed by cutting-out and folding of a flange fixed, for example by welding 92 or any other means such as crimping, onto the pole wheel 6, 7 in question; each wheel, in the above-mentioned way, featuring axial teeth directed towards the other wheel with the teeth of one wheel being imbricated into the other so as to form magnetic poles when the winding 5 is activated by virtue of the collector rings of the collector 3 each in contact with a brush (not referenced) carried by a brush holder 10 also serving as support for a voltage regulator (not visible) electrically linked to the brushes.

The regulator is linked to a current-rectifying device 11, such as a diode bridge (two diodes of which can be seen in FIG. 1), itself linked to the outlets of the phases equipped with windings, which the stator 12 of the alternator includes.

These fans 8, 9 extend in the vicinity respectively of a front bearing 13 and of a rear bearing 14. The bearings 13, 14 are pierced for internal ventilation of the alternator by way of the fans 8, 9 when the fans 8, 9—rotor 4—shaft 2 assembly is driven in rotation by the pulley 1 linked to the engine of the motor vehicle via a transmission device including at least one belt in engagement with the pulley 1. This ventilation makes it possible to cool the windings of the stator 12 and the coil 5, as well as the brush holder 10 with its generator and the rectification device 11. The path followed by the cooling fluid, here air, through the various apertures of the bearings 13, 14 and within the machine have been represented by arrows in FIG. 1.

This device 11, the brush holder 10, as well as a pierced protective cap (not referenced) are carried, fixed on, by the bearing 14 such that the rear fan 9 is more powerful than the front fan 8. In a known way, the bearings 13, 14 are linked together, here with the aid of screws or, in a variant, of tie rods which are not visible, so as to form a casing or support intended to be mounted on a fixed part of the vehicle.

The bearings 13, 14 each centrally carry a ball bearing 15, 16 for rotational support of the front and rear ends of the shaft 2 passing through the bearings in order to carry the pulley 1 and the rings of the collector 3.

The blades of the fans 8, 9 extend radially above housings which the bearings 13, 14 feature for mounting of the bearings 15 and 16 which are thus ventilated.

These blades delimit outwards-divergent channels between them. The fans here are of the same type as those described by the application FR 2,811,156 to which reference can be made for further details.

Hence, in one embodiment, at least some of the blades are of a decreasing height, going from their inner periphery to their outer periphery, and at least some of the blades are equipped, overhanging with respect to the bottoms of the channels, with means preventing secondary recirculation of the fluid above these said first blades.

The flow speed of the fluid is as constant and regular as possible.

This arrangement also makes it possible to reduce the axial bulk as regards the outer periphery of the rotor of the electric machine.

Furthermore, the efficiency of the fan and the stability of the flow of the cooling fluid are increased, preventing secondary fluid recirculation above the blades in question, and having blades of reduced thickness.

The means preventing secondary recirculation of the cooling fluid may consist of fins, bridges and/or a cover.

In another embodiment, with the aim of reducing the noise of the fan while enhancing the ventilation by it, it is proposed to equip the fan with a second series of blades, called second blades, on the one hand, shorter than those of the other series of blades called first series of blades, and, on the other hand, installed radially above the inner periphery of the first series of blades in at least one channel delimited by two consecutive first blades, in such a way that at least one second blade is interposed between two consecutive blades of the first series of blades.

By virtue of this characteristic, there is a reduction in the risks of flow separation of the cooling-fluid stream with respect to the blades, called first blades, of the first series of blades framing the second blade. If this fluid separates from the first blades, especially when the fluid penetrates with a shock between the first blades, the second blade will allow the fluid to stick back onto the first blades framing the second blade.

By virtue of these provisions, it is possible to dispense with one of the fans because of the enhancement in the performance of the remaining fan. The front fan is preferably dispensed with.

In a variant, the two fans are of identical size since, because of better performance from the rear fan, it is possible to reduce the size thereof, given that the front fan is more powerful than that of the prior art.

In general, for a given power of the fans, it is possible to reduce the size of them and thus the bulk, especially axial bulk, of the machine. For a given bulk, it is possible to increase the power from the alternator. These provisions can be applied globally, and can therefore apply to a fan fitted or not fitted with second blades. The fans described in the above-mentioned application FR 2,811,156, because of better performance, are particularly suitable for the stator 12, which features at least one piece for circumferential linking of the neutral points which is carried by one of the buns and creates a loss of pressure head. For preference, the piece or pieces for linking the neutral points are installed at the outer periphery of one of the buns in order to impede the ventilation of this bun as little as possible.

Advantageously, in order to reduce noise and to filter vibration, the body of the stator 12 is advantageously not in direct contact with the support 13, 14; elastic means intervening between the body of the stator 12 and the outer periphery of the support or casing 13, 14.

More precisely, elastomer buffers 100, 101 are interposed axially and radially between the axial ends of the body 17 of the stator 12, and the free ends of the axially oriented parts 102, 103 of the bearings 13, 14 belonging to the support. The buffers 100, 101 have an annular shape and are bracket-shaped in cross-section, in such a way that they partially cover over the outer periphery of the body 17. The free ends of the parts 102, 103 are, to that end, stepped internally in diameter in order to form a shoulder and to match the shape of the buffers 100, 101 externally.

These buffers constitute elastic damping means with radial and axial action so as to achieve mechanical decoupling of the body 17 of the stator 12 with respect to the casing consisting of the bearings 13, 14.

By virtue of these arrangements, the piece for linking the neutral point and its welding points with the inputs of the phases are formed together with the welding points of the pins in the way described below.

In a variant, the elastic damping means intervene in the region of the slots between the edges thereof and the electrically conducting elements, described below, mounted in them, as described in the document FR-A-2 803 128.

In a variant, elastically deformable thermally conducting resin is interposed radially between the outer periphery of the body 14 and the inner periphery of one of the bearings, such as the front bearing, as described in the document FR 00 13527 filed on Jun. 10, 2000. In this case, the coil 5 of the rotor 4 may be constructed on the basis of a conductor element wound and coated with a linking layer, for example of the thermosetting type, as described in the document FR-A-2 809 546. The coil 5 gives off more heat which is removed via the thermally conducting resin. In a variant, the body 14 is mounted directly on the bearings.

In a variant, the rotor includes salient poles as described in the document FR 01 00122 filed on May 1, 2001; permanent magnets being accommodated in housings formed in the pack of metal plates which the rotor includes. These housings are open towards the outer periphery of the rotor and closed axially by non-magnetic pieces intended to come into abutment against the magnets.

In a variant, the alternator is cooled by a cooling liquid, such as the cooling water from the internal-combustion engine of the motor vehicle; the rear bearing including channels as described, for example, in the document DE-A-100 19 914 to which reference may be made for further details. Advantageously, as described above, the stator in this case is mounted with the use of buffers made of elastic material, for example of elastomer, on the casing 13, 14 of the alternator in order to filter the vibration and reduce noise.

Figure 2:
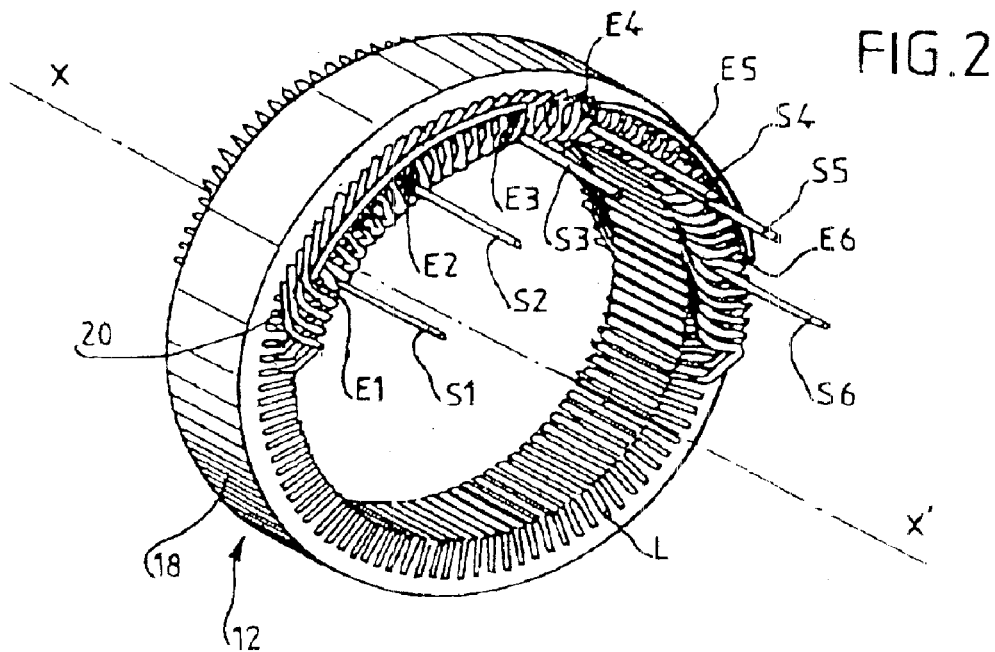
FIG. 2 is a view in perspective of the stator of FIG. 1, with conductor elements removed in order to show the slots of the body.
Figure 3:
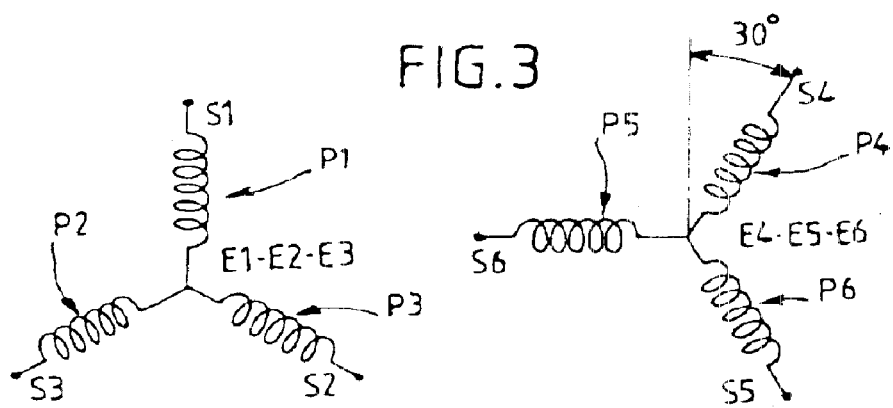
FIG. 3 is a diagrammatic representation of an example of the wiring of the windings of the phases.

FIGS. 2 and 3 represent a stator 12 comprising a cylindrical body 18 with axis X–X' and two series of three phases P1 to P3 and P4 to P6 constituting two series of three-phase coil [sic] shifted by 30° electrically, and behaving like a six-phase coil seen from the rectification-device side. For simplicity, in the remainder of the description, six-phase should be understood to mean two series of three-phase coil [sic] offset by 30° electrically, each three-phase coil wound in star mode having an independent neutral point.

Each phase P1 to P6 is each formed by a number of electrically conducting elements 20 mounted in series along the periphery of the stator 12 between an input, E1 to E6 respectively, and an outlet, S1 to S6 respectively, in order to form at least one phase winding per phase.

Figure 4:
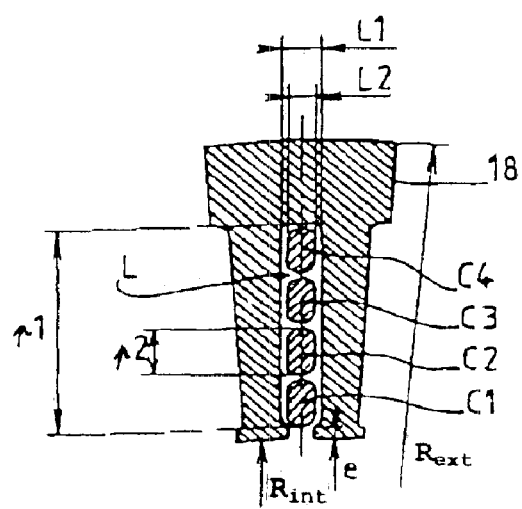
FIG. 4 is a view in cross-section showing the arrangement of the conductor elements in a slot in a first embodiment of the invention.

As FIG. 2 shows, the cylindrical body 18, also called pack of plates, comprises, in its radially inner face, radial slots L for accommodating at least four phase conductor elements 20. The conductor elements 20 are juxtaposed in the slot L in the radial direction so as to form at least four layers of conductor elements C1 to C4, as FIG. 4 shows in the case of slots with 4 conductor elements.

Figure 5:
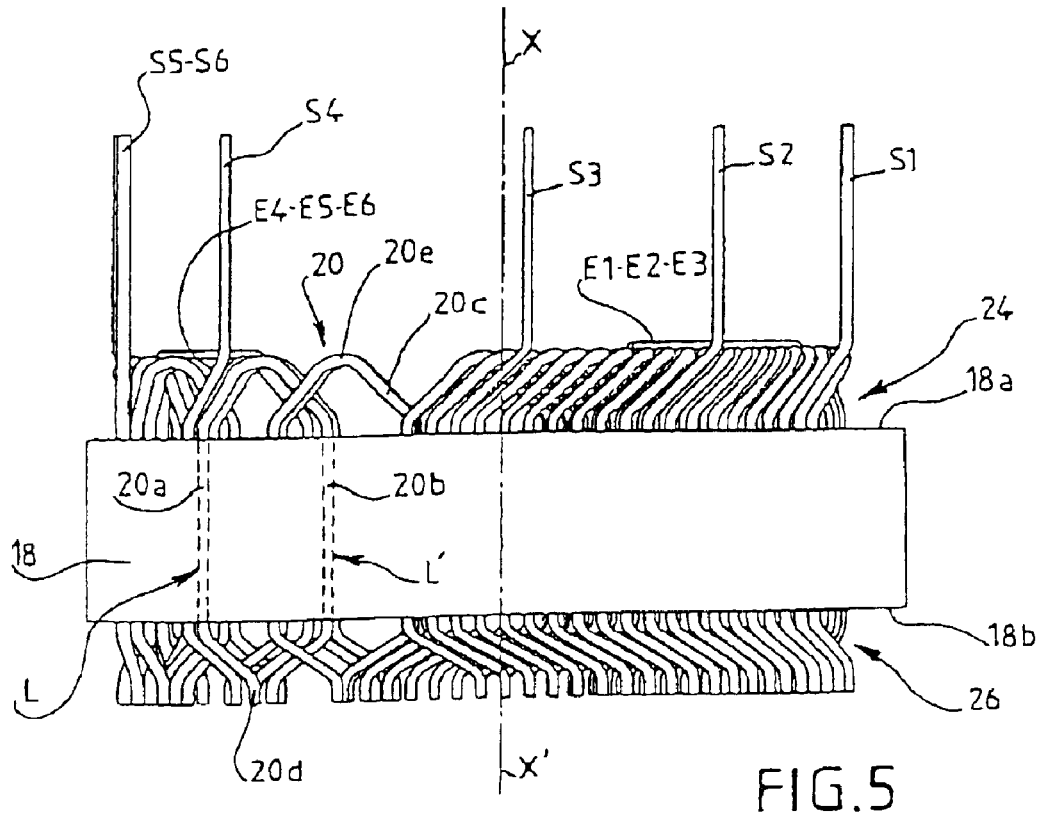
FIG. 5 is a top view of the stator according to the first embodiment of the invention.

As represented in FIG. 5, each conductor elements 20 exhibits the shape of a pin extending between two slots L and including a first branch 20a which is placed into a slot in a predetermined layer, a second branch 20b arranged in another slot in a predetermined layer and, between the two branches 20a and 20b, a head 20c forming a U-shape seen in the peripheral direction of the stator.

The U-shaped heads 20c are generally all arranged on a first axial side 18a of the body 18, forming a first bun 24.

The branches 20a and 20b of the conductor elements protrude from a second axial side 18b of the body 18 via free ends 20d, each free end 20d being electrically connected to a free end of a branch of another conductor element, for example by welding, thus forming the phase windings. The free ends 20d form the second bun 26.

The half of the conductor elements 20 engaged by their first branches 20a in a first slot L is engaged by their second respective branches in the same second slot L', each forming the said U-shapes between the two slots L and L'. The branches 20a and 20b all extend parallel to the axis X–X'.

The conductor elements 20, the inputs E1 to E6 and the outlets S1 to S6 are in the form of metal bars, typically made of copper, typically of rectangular cross-section, although other cross-sectional shapes can be envisaged, such as circular or oval cross-sections.

The notches L extend over the entire axial length of the body 18. They are, radially, of oblong shape and of half-closed type, as can be seen in FIG. 4. These notches L are distributed circumferentially, in a regular fashion.

The conductor elements 20 are mounted axially by threading into the slots L. They can also be mounted radially, the slots L then being closed over by wedges or by plastic deformation of the edges of the slot.

The intermediate, U-shaped portions 20c are twisted so as to be able to pass from one branch 20a situated on one layer to a branch 20b situated on a layer of different level.

The stators form part of alternators with 6, 7, 8 or 9 pole pairs. These stators may comprise three phases, two times three phases, 6 phases or more. Each phase may comprise one, two or more than two phase windings. Each slot L may comprise 4, 6, 8 conductor elements 20 or more.

The number of slots of the body 18 depends on these four factors. For example, for an alternator with 8 pole pairs, 6 phases, 4 windings per phase and 4 conductor elements per slot, the body 18 will include 96 slots referenced from L1 to L96 in the order in which they are arranged around the body 18.

In this particular instance, if a first conductor element 20 comprises a first branch 20a arranged in a given slot Lk, the second corresponding branch 20b is arranged in a slot Lk+6 located 6 slots further on.

The second branch 20b is connected by its free end 20d to a free end of a third branch 20a of a second conductor element 20, this third branch 20a being located in a slot Lk+12 located another 6 notches further on.

A phase winding corresponds to a set of linked conductor elements forming approximately one turn round the body 18.

A phase may comprise several phase windings in series linking the input to the outlet, forming several turns round the body in total. The phase windings may, in this case, be linked by special conductor elements, making it possible, for example, to reverse the direction of winding, or to offset the windings by one slot. In this latter case, the slots of the first winding are adjacent to the slots of the second winding, forming an electrical offset of 30° between these windings for a six-phase stator.

The phase inputs may be electrically linked so as to form a neutral point.

FIG. 3 diagrammatically represents a six-phase stator, the inputs E1 to E3 of the first three phases P1 to P3 being linked and the inputs E4 to E6 of the other three phases P4 to P6 likewise being linked. It can be seen, in FIG. 3, that the phase [sic] P4 to P6 are offset by 30° respectively with respect to the phases P1 to P3, which represents an offset by one slot L.

As was stated above, the half of the conductor elements 20 engaged by their first branches 20a in a first slot L is engaged by their second respective branches in the same second slot L', each forming the said U-shapes between the two slots.

According to the invention, at least one of the first and second conductor elements 20 of this said half are such that the radial spacing of the layers to which the two branches 20a and 20b of the said first conductor element 20 belong is the same as the radial spacing of the layers to which the two branches 20a and 20b of the said second conductor element 20 belong.

These first and second conductor elements are thus arranged strictly parallel over the larger part of their length, and it follows that the radii of curvature of the U-shapes of the first and second conductor elements 20 are substantially identical.

The advantages of this solution are explained later on.

FIGS. 5 to 8 illustrate this advantageous characteristic for a six-phase coil, in a first embodiment in which the slots L contain four conductor elements arranged over four layers C1 to C4.

FIG. 5 presents a six-phase alternator stator including a body 18 comprising, in the above-mentioned way, a pack of plates complete with slots L traversed by electrically conducting elements 20 here called pins.

The stator coil of the phases includes, on a first axial side 18a of the body 18, the first bun 24 which brings together all the heads 20c of all the pins as well as the phase outlet [sic] S1 to S3 respectively for a first coil including a first series of three phases P1 to P3, and S4 to S6 for the second coil including the second series of three phases P4 to P6, the stator coil of the six-phase type being made up, in the manner stated above, from the two series of three phases mounted in star mode and offset by 30° electrically as represented in FIG. 3. The bun 24 also includes the phase inputs as stated previously, also called neutral inputs, as well as their links or connections at an equipotential point. In this six-phase embodiment, the neutral inputs are 6 in number and are therefore linked in two groups of three inputs corresponding to the two star-mode coils.

Figure 24:
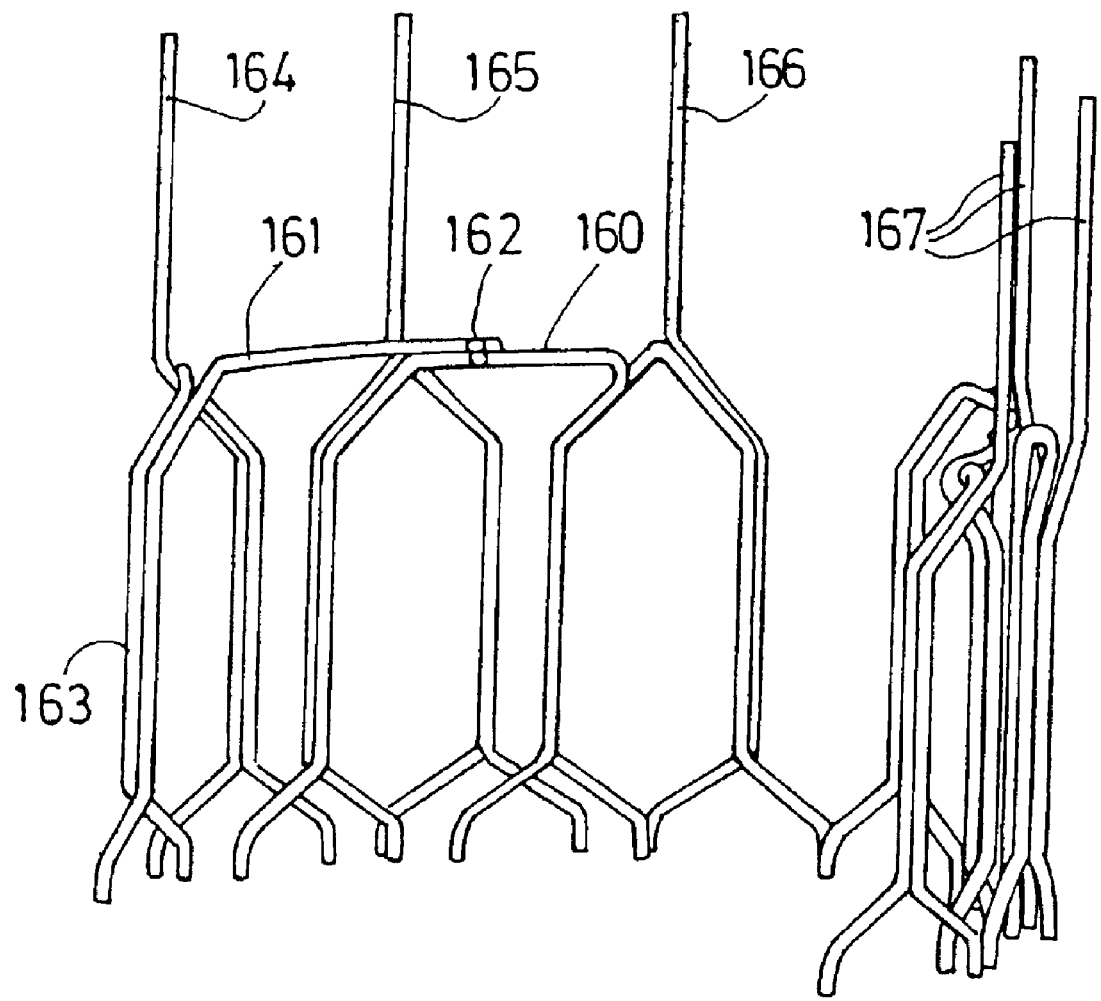
FIG. 24 is a view in perspective of the electrically conducting elements of FIG. 5.

FIG. 24 presents an advantageous variant of the device for connecting the neutral point. Two first neutral inputs are linked by a pin 160. The third neutral input is then linked to the previous pin via a single connection point produced, for example, in the form of an electron-beam weld 162. Thus it is possible to connect the equipotential neutral point with a single weld linking only two specific conductors 161, 160, thus increasing the reliability of the electrical connection. Each winding series can be produced with standard pins 140, 145, three standard pins 164, 165, 166 for phase outlet and two specific pins for the connection of the neutral point. A pin 163 is provided, moreover, which makes it possible to connect the coils in the region of the phase outlets and of the neutral point. The pins 164 to 166 correspond to standard pins of the imbricated or undulating type, in which one of the branches is extended axially. The three phase outlets of the second phase series can also be seen in this figure, at 167.

On the side opposite the bun 24 is found the second bun 26 which carries all the links/connections of the free ends 20d of the pins so as to form the phase windings. Advantageously, these connections are produced in weld form by electron beams or by laser as described in the application FR-0102735 filed on 28 Feb. 2001, which makes it possible to weld the free ends of the pins, for example by a mechanical process, without baring them beforehand.

Figure 6:
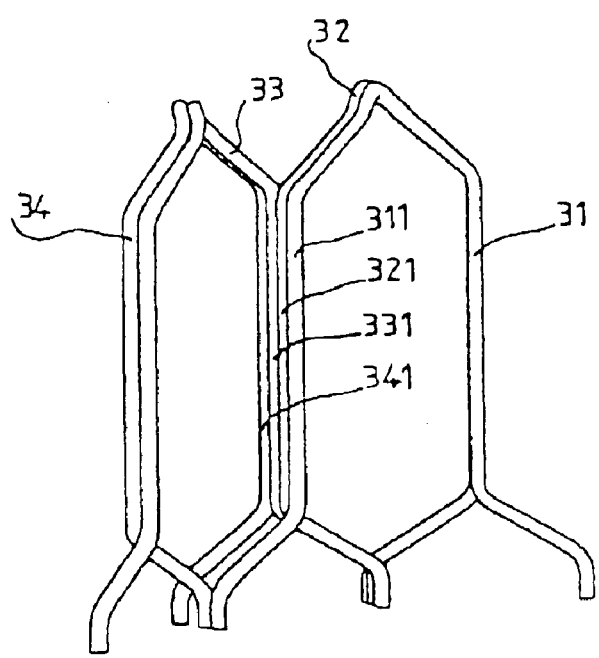
FIG. 6 is a view in perspective of the arrangement of four conductor elements of the same slot of the stator of FIG. 5.

This stator coil is produced, for each phase winding, by combining pins of the undulating type with pins of the imbricated type as represented in FIG. 6.

FIG. 6 represents a set of two undulating pins 31 and 33 and two imbricated pins 32 and 34. The 4 branches 311, 321, 331 and 341, adjacent to the four above-mentioned pins, are aligned radially in a slot L of the body of the stator as represented in FIG. 4. In the embodiment thus represented in FIG. 6, the branch 311 is placed on the gap side of the electric machine, that is to say at the inner periphery of a slot, while the branch 341 is placed in the region of the bottom of the slot. Thus the branch 311 belongs to a pin of the undulating type whereas the branch 341 belongs to a pin of the imbricated type. Quite obviously, the pin placed closer to the gap could be of the imbricated type.

As can be seen in FIGS. 5, 6 and 7, the vertices 20e of the heads 20c of the pins in the region of the bun 24 are situated axially substantially at the same level. Advantageously, this arrangement makes it possible to use only a single type of pin for manufacturing pins of the undulating and imbricated types. Hence, the cost of manufacture is reduced since a single piece of equipment is necessary for manufacturing these pins. The conductor elements shaped into pin form are threaded into the slots, by pushing their free ends axially into the slots until they emerge from the other side of the body of the stator. Then, in order to form the bun 26, the free ends of the pins are folded in such a way as to produce undulating and imbricated pins. The fact that the vertices 20e of the heads of the pins 20 are substantially situated axially at the same level represents an advantage since their alignment can be achieved in a single pushing operation by an appropriate tool. Another advantage conferred by the configuration of the bun 24 relates to its ventilation. This is because the fact that all the vertices of the heads of the pins are situated at the same level allows better ventilation since the interior of the heads of pins 20c constitutes a chamber free from any obstacle possibly impeding a good circulation of the cooling air, generated, for example, by the fan [sic] 8 and 9 which are represented in FIG. 1. Advantageously, the air penetrates easily through the blanks [sic] of the buns 24 and 26, emerging, also easily, as the ventilation arrows of FIG. 1 represent. It should be noted that, in this embodiment, the vertices 20e of the pin heads are adjacent, here being in contact with one another. Thus the bun 24 is more rigid, since all the pins are in contact thus forming a mechanically rigid assembly. We will thus advantageously obtain better vibratory reliability. The aerodynamic noise is also very much reduced, since there is no obstacle within the bun 24 which could give rise to aerodynamic noise which might be a nuisance during the operation of the electric machine at certain speeds. Likewise, the height of the bun 24 is reduced since all the vertices 20e are at the same level. Quite obviously, the phase outlets S1 to S6 extend in axial projection with respect to the heads 20c and to the inputs E1 to E6. It will also be noted that it is easily possible to adjust the axial length of the second bun 26 by pushing more or less on the heads 20c since they are situated at the same level. Finally, substantial standardisation of the pins is obtained.

It could be added, furthermore, that this arrangement of the pins makes it possible to avoid the presence of pins with a small radius of curvature, which exhibit a risk of damage to the enamel in the U-shaped area.

The vertices 20e of the heads 20c of the pins, in the region of the bun 24, are adjacent and in contact. Moreover, these vertices are offset radially alternately in the region of each consecutive pin. Thus, ventilation of the bun 24 is enhanced since the branches of two consecutive pins of the bun 24 are offset radially and alternately, which enhances their cooling.

FIG. 7 diagrammatically describes the arrangement of the conductor elements in the slots so as to obtain a six-phase coil of the type described above.

A pin head of the undulating type has been represented at 35, close to the gap, and a pin head of the imbricated type at 36. These two pins constitute a basic pattern or segment of a phase winding. More precisely, the head 35 is linked to the branches A and G of the pin in question, while the head 36 is linked to the branches B and H of this second pin. The said branches passing [sic] axially respectively through a slot Lk and Lk+6. Between these two slots Lk and Lk+6, 5 slots are provided, distributed circumferentially in a regular fashion for the windings of the other 5 phases. This is because the six-phase coil of our embodiment includes 2 slots per pole and per phase. Thus, for example, if the rotor of the electric machine includes 8 North and South poles, the stator will include 96 slots.

As can be seen in this figure, the branch B associated with the head 36 is implanted into the slot Lk radially above the branch A associated with the head 35. Likewise, the branch H associated with the head 36 is implanted in the slot Lk+6 radially above the branch G associated with the head 35. The branch H is adjacent to the bottom of the slot such that two branches F and E, associated with two other pin heads, are implanted radially below the branches H and G. Likewise, two branches D and C associated with two other pin heads are implanted radially above the branches B and A such that the heads 35 and 36 are parallel. This pattern is repeated again and again. In one slot, there are found two pairs of electrically conducting elements, a first pair of these elements, implanted at the outer periphery of the slot being linked by heads to another pair of conductor elements implanted at the inner periphery of another consecutive slot belonging to the same phase. The pairs are distributed alternately from one slot to another.

This regular pattern is interrupted in the region of the input and the outlet for the phase in question, as represented according to two possible embodiments in FIGS. 15 and 16, in which the pins corresponding to the heads 35 and 36 are identical to those of FIG. 7. In a first embodiment, the conductor D' corresponding to the conductor D of FIG. 7 constitutes the phase outlet of the winding in question, while the conductor E' corresponding to the conductor E of FIG. 7 constitutes the inlet to the neutral point of the said coil. In a second embodiment, the conductor C' corresponding to the conductor C of FIG. 7 constitutes the phase outlet of the winding in question, while the conductor F', corresponding to the conductor F of FIG. 7, constitutes the inlet to the neutral point of the said coil. Quite obviously, for these two embodiments, it is possible to invert the inputs and the outlets. The conductors C and F of FIG. 15 and the conductors D and E of FIG. 16 are linked respectively them [sic] by a special connecting pin.

As will have been understood, two pairs of conductor elements are mounted superimposed in each slot of the stator in such a way that a first pair is implanted above or below the second pair, and this takes place in an alternate way from one slot to another consecutive slot of the same phase, such that the heads of the pins are parallel and that the vertices of these pin heads are axially substantially at the same height.

FIG. 8 represents the pins 35 and 36 seen peripherally. It is seen clearly that the radii of curvature of the U-shaped heads of these pins are substantially equal.

FIGS. 9 and 10 illustrate a second embodiment of the invention in which the slots L contain six conductor elements arranged over six layers C1 to C6.

The head of a pin of the imbricated type has been represented at 37, and the head of a pin of the undulating type at 38, and the head of a third pin at 39, this head 39 straddling above the heads 35 and 36 as FIG. 7 shows.

It is quite obviously possible to have the reverse arrangement, the head 37 belonging to a pin of the undulating type and the head 38 belonging to a pin of the imbricated type.

The said three pins extend between a slot Lk and a slot Lk+6, in the case of a six-phase coil. The separation between these two slots would, obviously, be different if the stator included a different number of phases.

The head 37 joins a branch located on the layer C3 of the housing Lk to a branch located on the layer C5 of the housing Lk+6. In parallel, the head 38 joins a branch located on the layer C2 of the housing Lk to a branch located on the layer C4 of the housing Lk+6. It will be noted that the heads 37 and 38 are parallel over the major part of their lengths.

The head 39 joins a branch located on the layer C1 to a branch located on the layer C6.

These pins form the basic pattern of a phase winding, this pattern being reproduced over the entire circumference of the stator, the pin 39 being of the imbricated type or of the undulating type, as the case may be.

It can be seen in FIG. 10 that the U-shapes formed by the heads 37 and 38, when they are seen in a peripheral direction, feature substantially identical radii of curvature. The radius of curvature of the U-shape of the head 39 is larger.

FIGS. 11 and 12 illustrate a third embodiment of the invention in which the slots L contain eight conductor elements arranged over eight layers C1 to C8.

The head of a pin of the imbricated type has been represented at 40, the head of a pin of the undulating type at 41, the head of a pin of the imbricated type at 42, and the head of a pin of the undulating type at 43.

Conversely, the head 40 may belong to a pin of the undulating type, the head 41 then belonging to a pin of the imbricated type.

Likewise, the head 42 may belong to a pin of the undulating type, the head 43 then belonging to a pin of the imbricated type.

The heads 42 and 43 pass straddling over the heads 40 and 41.

The said four pins extend between a slot Lk and a slot Lk+6, in the case of a six-phase coil. The spacing between these two slots would, needless to say, be different if the stator included a different number of phases.

The head 40 joins a branch located on the layer C4 of the housing Lk to a branch located on the layer C6 of the housing Lk+6. In parallel, the head 41 joins a branch located on the layer C3 of the housing Lk to a branch located on the layer C5 of the housing Lk+6. It will be noted that the heads 40 and 41 are parallel over the major part of their lengths.

The head 42 joins a branch located on the layer C2 of the housing Lk to a branch located on the layer C8 of the housing Lk+6. In parallel, the head 43 joins a branch located on the layer C1 of the housing Lk to a branch located on the layer C7 of the housing Lk+6. It will be noted that the heads 42 and 43 are parallel over the major part of their lengths.

These pins form the basic pattern of a phase winding, this pattern being reproduced over the entire circumference of the stator.

It can be seen in FIG. 12 that the U-shapes formed by the heads 40 and 41, when they are seen in a peripheral direction, feature substantially identical radii of curvature. The radii of curvature of the U-shapes of the heads 42 and 43 are also substantially identical, and are larger than those of the heads 40 and 41.

FIGS. 13 and 14 illustrate a fourth embodiment of the invention in which the slots L likewise contain eight conductor elements arranged over eight layers C1 to C8.

The head of a pin of the imbricated type has been represented at 44, the head of a pin of the undulating type at 45, the head of a pin of the imbricated type at 46, and the head of a pin of the undulating type at 47.

Conversely, the head 44 may belong to a pin of the undulating type, the head 45 then belonging to a pin of the imbricated type.

Likewise, the head 46 may belong to a pin of the undulating type, the head 47 then belonging to a pin of the imbricated type.

The heads 44 and 45 never cross over the heads 46 and 47.

The said four pins extend between a slot Lk and a slot Lk+6, in the case of a six-phase coil. The spacing between these two slots would, needless to say, be different if the stator included a different number of phases.

The head 44 joins a branch located on the layer C6 of the housing Lk to a branch located on the layer C8 of the housing Lk+6. In parallel, the head 45 joins a branch located on the layer C5 of the housing Lk to a branch located on the layer C7 of the housing Lk+6.

The head 46 joins a branch located on the layer C2 of the housing Lk to a branch located on the layer C4 of the housing Lk+6. In parallel, the head 47 joins a branch located on the layer C1 of the housing Lk to a branch located on the layer C3 of the housing Lk+6.

It will be noted that the heads 44, 45, 46 and 47 are parallel over the major part of their lengths.

These pins form the basic pattern of a phase winding, this pattern being reproduced over the entire circumference of the stator.

It can be seen in FIG. 14 that the U shapes formed by the heads 44, 45, 46 and 47 when they are viewed in a peripheral direction feature substantially identical radii of curvature.

FIGS. 17 and 18 represent two variant embodiments for the twisting of the free ends 20d of the branches of the conductor elements in the second embodiment in which each housing L contains 4 conductor elements.

In the first variant, the free ends of the branches located on the layers C4 and C2 are twisted in a peripheral direction, the free ends of the branches located on the layers C3 and C1 being twisted in an opposite peripheral direction.

In the second variant, the free ends of the branches located on the layers C4 and C1 are twisted in a peripheral direction, the free ends of the branches located on the layers C3 and C2 being twisted in an opposite peripheral direction.

The second variant is represented in perspective in FIG. 19.

These arrangements relating to the twisting of the free ends of the conductor elements can, needless to say, be generalised to the embodiments in which the slots L contain 6 or 8 conductor elements.

Several preferred embodiments of the invention will be described below, in which the number N of pole pairs of the rotor 4 and the main dimensions of the stator 12 have been optimised.

The principal criterion used for this optimisation is the specific power of the alternator, that is to say the capacity of the alternator to deliver current by comparison with the weight of its active part, consisting essentially of the coil 5 of the rotor 4, of the phases P of the stator 12, of the body 18 of the stator 12 and of the pole wheels 6, 7 of the rotor 4. This criterion is particularly relevant since present-day motor vehicles require ever-greater amounts of electrical power to be available in order to feed increasing numbers of consumer units. However, this increase in power should not entail an excessive increase in the outer dimensions of the alternator. This is because the alternator is always placed under the engine and bonnet where, as everyone knows, the space available is very restricted. The external size of the alternator thus becomes a defining selection criterion. It is known, furthermore, that the number of pole pairs is an influential parameter as regards the specific power of the alternator.

The person skilled in the art of alternators including stators wound with round-wire coils knows that, when the number of rotor pole pairs increases, then the frequency of the flux induced increases in the same proportions, as does the induced current and the iron losses within the stator. These iron losses, resulting from eddy currents, tend to reduce the efficiency of the alternator.

Likewise, the person skilled in the art of alternators including stators wound with round-wire coils increases the number of pole pairs with the diameter of the machine. His objective is in fact to keep control of the losses of magnetic flux between the adjacent teeth of different magnetic polarity. This magnetic leakage flux passes directly from one tooth of the rotor of the Lundell type to another other [sic] which is adjacent to it, but of different sign, without passing through the body of the stator. The consequence is that the performance of the alternator is weakened, since the induced current is consequently weaker. In order to reduce these rotor magnetic-flux leakages, it is known to fit inter-teeth magnets, as described, for example, in the document FR 2,784,248. These magnets have the double function of, on the one hand, creating a supplementary magnetic flux which is added to the rotor flux created by the excitation coil of the rotor and, on the other hand, of cancelling the inter-teeth magnetic leakage flux described above.

In the state of the art, the alternators wound with round wire including rotors with 6, 7 and 8 pole pairs are known.

For example, the document U.S. Pat. No. 3,252,025, published on 17 May 1966, discloses an alternator with 7 pole pairs. This configuration of the rotor was used at that time for better imbrication of the pole wheels before cutting-out, which reduced the extent of the wastage of raw materials. After cutting-out, these pole wheels were than folded, cold, in order to exhibit the final shape of the pole wheels with the teeth oriented parallel to the axis of the alternator. The method of producing pole wheels by cold folding remains more economical than the method of hot forging, although it features losses of material. The choice of seven pole pairs was, above all, dictated by economic imperatives of the method and not by a concern for optimisation of the alternator in the course of operation.

The choice of the number of pole pairs in stators wound with round wires is dictated principally either by considerations of the method, or on the basis of the diameter of the machine in order to guarantee reasonable leakages of inter-teeth magnetic flux, with or without inter-teeth magnets. As soon as the number of pole pairs is fixed, technical devices are then put in place in the alternator in order to reduce, for example, the iron losses which can occur, for example within the stator or the rotor.

Likewise, in the case of alternators featuring a relatively large diameter, it is necessary to take account of the problems of centrifugation in the region of the teeth of the rotor which can separate and come to strike the stator. Thus, a folded or forged wheel will have different behaviour during centrifugation and, for a given diameter, the number of poles which provides the best mechanical behaviour may be different according to one or the other method.

Alternators wound with pins exhibit a different geometry from those wound with round wires. For example, the active part of the stator facing the rotor features an active magnetic part of different surface area, since, in the case of a coil produced with pins, the said pins are inserted through the axial apertures of the slots of the stator and not through the radial apertures of the slots as is the case for stators wound with conventional round wires.

From the foregoing, it is clearly apparent that an alternator wound with round wires exhibits a different magnetic behaviour when it is wound with pins, since the geometry of the machine is different.

It is therefore necessary to choose the number of rotor pole pairs correctly, which makes it possible to obtain the optimum specific power, given that, in the context of an alternator wound with pins for a fixed number of pins per slot and for a fixed outer diameter of the body of the stator, this number of pole pairs being [sic] one of the most important parameters capable of influencing the said specific power.

In a first preferred embodiment, the alternator comprises a rotor 4 with seven pole pairs and a six-phase stator 12 with two series of three phases P offset by 30° electrically.

The body 18 of the stator 12 comprises slots each containing four conductor elements 20 as pins of substantially rectangular cross-section, like those described above, arranged in accordance with FIGS. 3 to 8.

The inputs E1 to E3 and E4 to E6 of the two series of three phases are linked respectively to a neutral point.

The principle dimensions of the stator are indicated below, principally by reference to FIG. 4. The outer diameter $R_{ext}$ of the body 18 of the stator is 135 mm. It can vary from 132 mm to 138 mm without the performance of the alternator being greatly affected. The inner diameter $R_{int}$ of this body 18 is 108 mm. The stator comprises 84 identical slots L arranged over the inner radial face of the body 18 according to a regular pitch of 4.286°. The width L1 of the slots is 2.05 mm and their depth p1 is 10.3 mm. The radial thickness e of the solid part partially closing the aperture of the slot is 0.4 mm. The width L2 of the branches of the conductor elements passing into the slot is 1.55 mm and their thickness p2 is 2.4 mm. The radius of curvature of the angles of the cross-section of these branches is 0.5 mm. These branches are surrounded by a layer of insulating material 160 μm thick. The yoke of the stator is the part lying between the outer peripheral part of the stator and the bottom of the slots. In order to have optimum specific power, the ratio of the thickness of the yoke with respect to the length L1 of the slots should have a value lying between 0.51 and 0.57.

Figure 22:
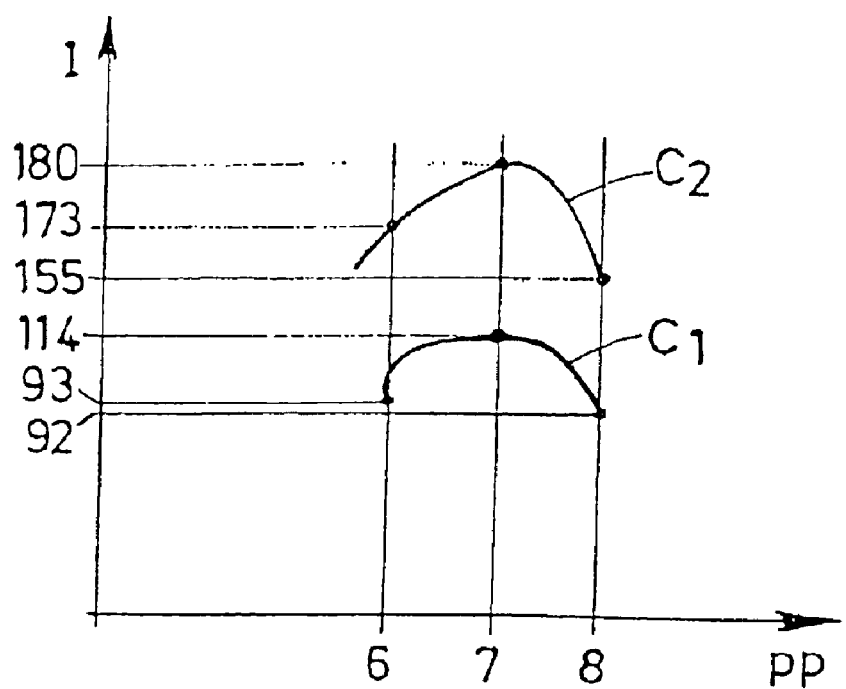
FIG. 22 is a curve comparing the electrical current strengths produced by three alternators in accordance with FIGS. 3 to 8, with stators of outer diameter 135 mm, comprising 6, 7 and 8 pole pairs respectively.

The curve of FIG. 22 compares the electrical current strength I expressed in amperes supplied by 3 alternators all in accordance with FIGS. 3 to 8 and with a body 18 of outer diameter 135 mm, comprising respectively 6 pole pairs PP, 7 pole pairs PP and 8 pole pairs PP, for two rotational speeds, 1800 rpm (curve C1) and 6000 rpm (curve C2).

1800 and 6000 rpm respectively represent the idling speed of the internal-combustion engine of the motor vehicle and an average speed.

The size of the conductor elements is the same for the three alternators, and corresponds to the dimensions given above.

The specific power varies as a function of the number of poles in the same way as the current strength, since the mass of an alternator varies little when going from 6 to 8 pole pairs.

It is seen clearly that the maximum current strength, and thus the maximum specific power, is produced by the alternator with 7 pole pairs, which therefore represents the efficiency optimum for the outer diameter of 135 mm.

The other dimensional characteristics of the alternator in the preferred embodiment described above stem directly from the competence of the person skilled in the art, once the number of pole pairs and the outer diameter of the body 18 have been fixed.

This optimum with 7 pole pairs is explained above all by the fact that the stator 12, in this configuration, features optimum iron/copper proportions, that is to say optimum magnetic path/electric path proportions.

7 pole pairs make it possible to have a stator body featuring teeth 80 separating two contiguous slots L which are ideally proportioned in terms of number and of width, for a nominal target current at 180 A, in keeping with the flux which the rotor 4 can deliver.

On the other hand, 8 pole pairs lead to teeth 80 which are too narrow and are saturated from a magnetic point of view. This configuration would be suitable for a smaller rotor delivering a weaker magnetic flux.

6 pole pairs lead to teeth 80 which are too numerous to produce sufficient current strength, and hardly saturated from a magnetic point of view. They would be capable of passing a stronger magnetic flux than that which the rotor 4 can deliver, and are therefore suitable for a larger rotor.

In a second preferred embodiment, the alternator comprises a rotor 4 with six pole pairs and a six-phase stator 12 with two series of three phases P offset by 30° electrically.

The body 18 of the stator 12 comprises 72 slots each containing four conductor elements 20 as pins of substantially rectangular cross-section, like those described above, arranged in accordance with FIGS. 3 to 8.

The outer diameter $R_{ext}$ of the body 18 of the stator is 140 mm. It can vary from 137 mm to 143 mm without the performance of the alternator being greatly affected.

Figure 23:
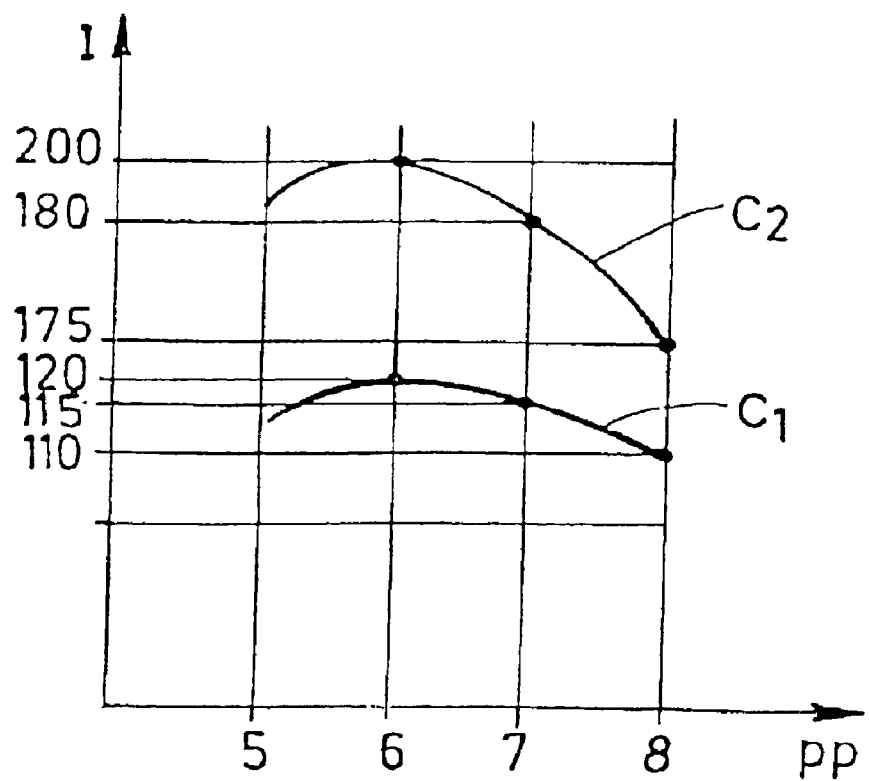
FIG. 23 is a figure similar to FIG. 22 for three alternators with stators of outer diameter 140 mm.

As before, the curve of FIG. 23 compares the electrical current strength I expressed in amperes supplied by 3 alternators all in accordance with FIGS. 3 to 8 and with a body 18 of outer diameter 140 mm, comprising respectively 6 pole pairs PP, 7 pole pairs PP and 8 pole pairs PP, for two rotational speeds, 1800 rpm (curve C1) and 6000 rpm (curve C2).

It is seen clearly that the maximum current strength, and thus the maximum specific power, is produced by the alternator with 6 pole pairs, which therefore represents the efficiency optimum for the outer diameter of 140 mm.

The other dimensional characteristics of the alternator in the preferred embodiment described above stem directly from the competence of the person skilled in the art, once the number of pole pairs and the outer diameter of the body 18 have been fixed. They are not indicated here.

The two preferred embodiments have been described in the case in which the slots of the stator contain 4 conductors. They can easily be adapted to the cases in which the slots contain 6 or 8 conductors.

The first preferred embodiment of the invention described above brings into play an asymmetric rotor 4 with 7 pole pairs. The input 50 and outlet 51 wires of the coil 5 of this rotor are linked to the collector 3. So as to be able to use a conventional, symmetric collector, already used for alternators with an even number of pole pairs, one advantageous arrangement is provided for the invention, which will now be described by reference to FIGS. 20 and 21.

As explained above, the rotor comprises two, front and rear, pole wheels 6 and 7, each carrying teeth at their periphery, referenced 71 to 77 following the periphery of the rear pole wheel in the normal direction of rotation of the rotor 4 shown symbolically by an arrow in FIG. 20. Each pole wheel comprises 7 teeth, since the alternator, in the first preferred embodiment, comprises 7 pole pairs.

The teeth 71 to 77 of the rear pole wheel are separated from one another by grooves 71' to 77'.

The rotor 4 also comprises 2 hooks 78 and 78' carried by the rear face of the rear pole wheel 7. These hooks 78 and 78' are situated in proximity to the shaft 2 and are diametrally opposite with respect to the axis of the shaft 2. They are linked electrically to the collector 3.

The input wire 50 links the hook 78 to the coil 5. It extends radially from the hook 78 as far as the first groove 71'.

In the prior art, the outlet wire 51 links the hook 78' to the coil 5 by passing through a hole formed in the base of the tooth 74, that is to say in a direction exactly diametrally opposite to the first groove 71'. The two input and outlet wires 50 and 51 are symmetric with respect to the rotational axis of the machine, and this device is therefore suitable for a conventional collector 3.

This solution features the following drawbacks. The cross-section for passage of the magnetic flux is reduced by the presence of the hole, and this is in the most saturated part of the rotor, which causes a degradation in the performance of the machine.

The fitting of the coil 5 is awkward since it is necessary to make the outlet wire 51 pass blind through the hole, which risks giving rise to numerous manufacturing defects.

Finally, the hole is situated close to earth, which entails risks of a short-circuit.

According to the invention, the outlet wire 51 extends radially from the hook 78' as far as a second groove, this second groove being the groove 74' or the groove 75', these two grooves being diametrally opposite to the groove 71'.

For preference, the outlet wire 51 passes through the groove 75', since this arrangement is more favourable for the hooking to the hook 78'.

This arrangement avoids having to pierce a hole in the rotor, and nonetheless makes it possible to connect the input and outlet wires 50 and 51 to a symmetric collector 3.

Capstans 79 are situated in the grooves 71' and 74'/75'. These capstans 79 each comprise a radial spindle integral with the rotor at one end, and a stud mounted at the free opposite end.

The input and outlet wires 50 and 51 each perform one turn of the capstans 79 situated respectively in the first and second grooves 71' and 74'/75' before rejoining the coil 5.

It should be noted that this arrangement of the input and outlet wires 50 and 51 dictates that a passage be provided for the wires to pass into the rear fan 9.

This arrangement can obviously be used with any rotor comprising an odd number of pole pairs.

Advantageously, the rear fan 9 includes clearings 93 and 94 which respectively allow the wires 50 and 51 to pass between the flange of the rear pole wheel and the fan.

Advantageously, in another embodiment, the two neutral points are rectified. Thus, the electric machine delivers more current into the electrical network while presenting an acceptable level of ripple.

Likewise, in a variant, the alternator is an alternator/starter, that is to say a reversible machine constituting an alternator when the pulley is driven by the engine of the motor vehicle, or a starter for driving the engine of the vehicle via the pulley as described, for example, in the document FR-A-2 806 224. In this case, one of the bearings 15, 16 carries at least one sensor, for example of the magnetic type, in order to detect the passing of a magnetic target carried by the rotor.

The rectification bridge is then a rectification and control bridge, which, in one embodiment, is installed outside the reversible alternator. The phase outlets are then linked to a connector carried by the alternator and linked to the rectification and control device via a cable. For further details, refer to this document.

The electric machine according to the invention with a linking part is a high-power, compact, low-noise and well-cooled machine.

What is claimed is:

1. An alternator for a motor vehicle comprising a stator, a claw-type rotor with N pole pairs which is arranged inside the stator and carries an excitation coil complete with an input wire and with an outlet wire, the stator comprising a cylindrical body, several phases each formed by a plurality of electrically conducting elements mounted in series along the periphery of the stator between an input and an outlet, the cylindrical body comprising, in its radially inner face, radial slots for accommodating at least four phase-conductor elements which are juxtaposed in the slot in the radial direction so as to form at least four layers of conductor elements, each conductor element exhibiting the form of a pin extending between two slots and including a first branch which is placed in a slot in a predetermined layer, and a second branch arranged in another slot in a predetermined layer and, between the two branches, on one axial side of the body of the stator, a head forming a U-shape seen in the peripheral direction, while, on the other axial side of the body, a free end of a branch of a conductor element is electrically connected to a free end of a branch of another conductor element, the half of the conductor elements which are engaged by their first branches in a slot being engaged by their second respective branches in the same other slot, each forming the said U-shapes between the two slots, wherein at least first and second conductor elements of the said half are such that the radial spacing of the layers to which the two branches of the said first conductor element belong is the same as the radial spacing of the layers to which the two branches of the said second conductor element belong, and in that the radii of curvature of the U-shapes of the two conductor elements are substantially identical, with eight conductor elements per slot, four of these conductor elements extending between the same two slots, wherein the said four conductor elements are grouped in pairs of adjacent conductors, the above-mentioned radial spacing being the same for the two conductor elements of the one pair, and wherein the radii of curvature of the U-shapes of the two conductor elements of the one pair are substantially identical.

2. An alternator according to claim 1, wherein the above-mentioned radial spacing of the conductor elements of one of the two pairs is different from the above-mentioned radial spacing of the conductor elements of the other pair, and the radii of curvature of the U-shapes of the conductor elements of the two pairs are different.

3. An alternator according to claim 1, wherein the above-mentioned radial spacing of the conductor elements of one of the two pairs is the same as the above-mentioned radial spacing of the conductor elements of the other pair and the radii of curvature of the U-shapes of the two pairs are substantially identical.

4. An alternator according to claim 1, wherein at least some of the phase inputs are linked electrically so as to form a neutral point.

5. An alternator according to claim 1, wherein the outlets of the phases of the stator are linked to a current-rectification device with at least 12 diodes.

6. An alternator for a motor vehicle comprising a stator, a claw-type rotor with N pole pairs which is arranged inside the stator and carries an excitation coil complete with an input wire and with an outlet wire, the stator comprising a cylindrical body, several phases each formed by a plurality of electrically conducting elements mounted in series along the periphery of the stator between an input and an outlet, the cylindrical body comprising, in its radially inner face, radial slots for accommodating at least four phase-conductor elements which are juxtaposed in the slot in the radial direction so as to form at least four layers of conductor elements, each conductor element exhibiting the form of a pin extending between two slots and including a first branch which is placed in a slot in a predetermined layer, and a second branch arranged in another slot in a predetermined layer and, between the two branches, on one axial side of the body of the stator, a head forming a U-shape seen in the peripheral direction, while, on the other axial side of the body, a free end of a branch of a conductor element is electrically connected to a free end of a branch of another conductor element, the half of the conductor elements which are engaged by their first branches in a slot being engaged by their second respective branches in the same other slot, each forming the said U-shapes between the two slots, wherein at least first and second conductor elements of the said half are such that the radial spacing of the layers to which the two branches of the said first conductor element belong is the same as the radial spacing of the layers to which the two branches of the said second conductor element belong, and in that the radii of curvature of the U-shapes of the two conductor elements are substantially identical, with six conductor elements per slot, three of which extend between the same two slots, wherein two of the said conductor elements are adjacent and exhibit the same above-mentioned radial spacing, the radii of curvature of the two U-shapes of the two conductor elements being substantially identical.

7. An alternator for a motor vehicle comprising a stator, a claw-type rotor with N pole pairs which is arranged inside the stator and carries an excitation coil complete with an input wire and with an outlet wire, the stator comprising a cylindrical body, several phases each formed by a plurality of electrically conducting elements mounted in series along the periphery of the stator between an input and an outlet, the cylindrical body comprising, in its radially inner face, radial slots for accommodating at least four phase-conductor elements which are juxtaposed in the slot in the radial direction so as to form at least four layers of conductor elements, each conductor element exhibiting the form of a pin extending between two slots and including a first branch which is placed in a slot in a predetermined layer, and a second branch arranged in another slot in a predetermined layer and, between the two branches, on one axial side of the body of the stator, a head forming a U-shape seen in the peripheral direction, while, on the other axial side of the body, a free end of a branch of a conductor element is electrically connected to a free end of a branch of another conductor element, the half of the conductor elements which are engaged by their first branches in a slot being engaged by their second respective branches in the same other slot, each forming the said U-shapes between the two slots, wherein at least first and second conductor elements of the said half are such that the radial spacing of the layers to which the two branches of the said first conductor element belong is the same as the radial spacing of the layers to which the two branches of the said second conductor element belong, and in that the radii of curvature of the U-shapes of the two conductor elements are substantially identical, with four conductor elements per slot, two of which extend between the same two slots, the four layers of conductor elements being referenced C1, C2, C3 and C4 in increasing order of separation from the inner radial face of the body, wherein these two conductor elements are adjacent and exhibit the same above-mentioned radial spacing, the radii of curvature of the two U-shapes of the two conductor elements being substantially identical.

8. An alternator according to claim 7, wherein the phase inputs are linked to branches of conductor elements in layer C1, the corresponding outlets being linked to branches of conductor elements in layer C4.

9. An alternator according to claim 7, wherein the phase inputs are linked to branches of conductor elements in layer C4, the corresponding outlets being linked to branches of conductor elements in layer C1.

10. An alternator according to claim 7, wherein the phase inputs are linked to branches of conductor elements in layer C2, the corresponding outlets being linked to branches of conductor elements in layer C3.

11. An alternator according to claim 7, wherein the phase inputs are linked to branches of conductor elements in layer C3, the corresponding outlets being linked to branches of conductor elements in layer C2.

12. An alternator according to claim 7, wherein, for each slot, at least one part of the free end of the branches situated in layers C1 and C4 is inclined along a first direction, at least a part of the free end of the branches situated in layers C2 and C3 being inclined along a second direction symmetric with the first one with respect to the radial plane in which the slot is located.

13. An alternator according to claim 7, wherein, for each slot, at least one part of the free end of the branches situated in layers C1 and C3 is inclined along a first direction, at least a part of the free end of the branches situated in layers C2 and C4 being inclined along a second direction symmetric with the first one with respect to the radial plane in which the slot is located.

14. An alternator for a motor vehicle comprising a stator, a claw-type rotor with N pole pairs which is arranged inside the stator and carries an excitation coil complete with an input wire and with an outlet wire, the stator comprising cylindrical body, several phases each formed by a plurality of electrically conducting elements mounted in series along the periphery of the stator between an input and an outlet, the cylindrical body comprising, in its radially inner face, radial slots for accommodating at least four phase-conductor elements which are juxtaposed in the slot in the radial direction so as to form at least four layers of conductor elements, each conductor element exhibiting the form of a pin extending between two slots and including a first branch which is placed in a slot in a predetermined layer, and a second branch arranged in another slot in a predetermined layer and, between the two branches, on one axial side of the body of the stator, a head forming a U-shape seen in the peripheral direction, while, on the other axial side of the body, a free end of a branch of a conductor element is electrically connected to a free end of a branch of another conductor element, the half of the conductor elements which are engaged by their first branches in a slot being engaged by their second respective branches in the same other slot, each forming the said U-shapes between the two slots, wherein at least first and second conductor elements of the said half are such that the radial spacing of the layers to which the two branches of the said first conductor element belong is the same as the radial spacing of the layers to which the two branches of the said second conductor element belong, and in that the radii of curvature of the U-shapes of the two conductor elements are substantially identical, and wherein the rotor comprises 7 pole pairs, the outer diameter of the cylindrical body of the stator lying between 132 mm and 138 mm.

15. An alternator according to claim 14, wherein the rotor comprises two, front and rear, pole wheels integral with a shaft, each carrying, at their periphery, seven axial teeth oriented towards the other pole wheel, the axial teeth of the one wheel forming grooves between them, the input wire of the coil of the rotor extending radially substantially between the shaft and a first one of the said grooves of the rear pole wheel, the outlet wire extending radially substantially between the shaft and a second groove, this second groove being one of the said two grooves diametrally opposite the first groove.

16. An alternator according to claim 15, wherein the outlet wire extends radially substantially between the shaft and the groove diametrally opposite the first groove and offset in angle in the normal direction of rotation of the rotor.

17. An alternator according to claim 15, wherein the outlet wire extends radially substantially between the shaft and the groove diametrally opposite the first groove and offset in angle in the reverse direction to the normal rotation of the rotor.

18. An alternator according to claim 15, wherein a capstan is arranged in each of the first and second grooves, the input and outlet wires making respectively at least one turn round the capstan situated in the first and second grooves.

19. An alternator according to claim 18, wherein the capstans each comprise a radial spindle fixed to the rotor and a stud fixed to a free end of the radial spindle.

20. An alternator for a motor vehicle comprising a stator, a claw-type rotor with N pole pairs which is arranged inside the stator and carries an excitation coil complete with an input wire and with an outlet wire, the stator comprising a cylindrical body, several phases each formed by a plurality of electrically conducting elements mounted in series along the periphery of the stator between an input and an outlet, the cylindrical body comprising, in its radially inner face, radial slots for accommodating at least four phase-conductor elements which are juxtaposed in the slot in the radial direction so as to form at least four layers of conductor elements, each conductor element exhibiting the form of a pin extending between two slots and including a first branch which is placed in a slot in a predetermined layer, and a second branch arranged in another slot in a predetermined layer and, between the two branches, on one axial side of the body of the stator, a head forming a U-shape seen in the peripheral direction, while, on the other axial side of the body, a free end of a branch of a conductor element is electrically connected to a free end of a branch of another conductor element, the half of the conductor elements which are engaged by their first branches in a slot being engaged by their second respective branches in the same other slot, each forming the said U-shapes between the two slots, wherein at least first and second conductor elements of the said half are such that the radial spacing of the layers to which the two branches of the said first conductor element belong is the same as the radial spacing of the layers to which the two branches of the said second conductor element belong, and in that the radii of curvature of the U-shapes of the two conductor elements are substantially identical, and wherein the rotor comprises 6 pole pairs, the outer diameter of the cylindrical body of the stator lying between 137 mm and 142 mm.

* * * * *